United States Patent
Cardone et al.

(10) Patent No.: US 8,957,750 B2
(45) Date of Patent: Feb. 17, 2015

(54) MODULAR MAGNETIC DEVICE FOR CLAMPING FERROMAGNETIC WORKPIECES

(75) Inventors: Michele Cardone, Trezzano sul Naviglio (IT); Giovanni Cosmai, Rescaldina (IT); Roberto Faranda, Milan (IT); Antonino Giglio, Pero (IT)

(73) Assignee: Tecnomagnete S.p.A., Milan (IT)

( * ) Notice: Subject to any disclaimer, the term of this patent is extended or adjusted under 35 U.S.C. 154(b) by 0 days.

(21) Appl. No.: 14/345,860

(22) PCT Filed: Jul. 26, 2012

(86) PCT No.: PCT/IB2012/053826
§ 371 (c)(1),
(2), (4) Date: Mar. 19, 2014

(87) PCT Pub. No.: WO2013/041984
PCT Pub. Date: Mar. 28, 2013

(65) Prior Publication Data
US 2014/0232499 A1    Aug. 21, 2014

(30) Foreign Application Priority Data

Sep. 19, 2011   (IT) .............................. MI2011A1679

(51) Int. Cl.
*H01F 7/20* (2006.01)
*B23Q 3/154* (2006.01)
*B25B 11/00* (2006.01)

(52) U.S. Cl.
CPC ............ *B23Q 3/1543* (2013.01); *B25B 11/002* (2013.01)

USPC .......................................... 335/289; 335/290

(58) Field of Classification Search
USPC ....................... 335/285, 286, 289, 290; 269/8
See application file for complete search history.

(56) References Cited

U.S. PATENT DOCUMENTS

| 3,774,133 A | 11/1973 | Voges |
| 6,489,871 B1 * | 12/2002 | Barton ........................... 335/285 |
| 2011/0248435 A1 * | 10/2011 | Cosmai et al. .................... 269/8 |

FOREIGN PATENT DOCUMENTS

FR           1434671 A        4/1966

* cited by examiner

*Primary Examiner* — Ramon Barrera
(74) *Attorney, Agent, or Firm* — Alan G. Towner Esq.; Pietragallo Gordon Alfano Bosick & Raspanti, LLP

(57) ABSTRACT

The present invention refers to a magnetic device for clamping ferromagnetic workpieces comprising a frame having a first magnetic circuit configured to generate a first magnetic field adapted to clamp a ferromagnetic workpiece to be processed; a second magnetic circuit configured to generate a second magnetic field adapted to clamp said ferromagnetic workpiece to a machine tool bed; said first magnetic circuit and said second magnetic circuit being adapted to be controlled to turn on and/or off independently one from the other. The modular magnetic device is characterized in that it comprises first and second mechanical and electrical connection means for mechanically and electrically connecting said magnetic device, when in operation, to corresponding second and first complementary mechanical and electrical connection means of other modular magnetic devices located adjacent thereto, to create a series of modular magnetic devices mechanically and electrically connected together.

10 Claims, 3 Drawing Sheets

MODULAR MAGNETIC DEVICE FOR CLAMPING FERROMAGNETIC WORKPIECES

TECHNICAL FIELD

The present invention refers to a magnetic device for clamping ferromagnetic workpieces, particularly, a modular magnetic device for clamping magnetic workpieces, according to claim 1.

STATE OF THE ART

Actually, for mechanically processing (turning, milling, etc.) ferrous elements, for example the ring-shaped ones, such as: fifth wheels, bearings and round flanges used in power plants and wind generators, earth moving machines, radars and communications equipment, cranes on off-shore rigs, machine tools, and gearboxes, and also in marine engines and transmissions, magnetic plates are used.

In order to process these elements, such magnetic plates must have a diameter equal to or slightly greater than the one of the bed of a machine tool necessary for performing said mechanical processing in order to better exploit the capacity of the machine tool, without wasting spaces for receiving supplemental clamping systems, such as clamps.

For example, when the element to be mechanically processed is one of the above identified elements, and has, for example, a diameter not greater than 2000 mm, it is generally known the use of the typical integrally-made magnetic plates having the same diameter.

When elements having a diameter greater than 2000 mm must be subjected to mechanical processings, the state of the art provides the use of magnetic plates formed by several magnetic sectors, which can be directly attached to the machine bed, on dedicated sub-plates or adapted support pallets.

Despite the fact that these techniques are nowadays widely and advantageously used, it is apparent that the magnetic plates of the type described before show some disadvantages both from the economic point of view and the performance point of view.

The magnetic plates of the above described type, in order to fully exploit the capacities of the machine tool, are indeed made for clamping ferromagnetic workpieces having variable diameters to their maximum size; for this reason all the surface of the magnetic plate is magnetically activable even though a substantial portion, during the clamping step, will not be exploited for clamping a workpiece.

Therefore, it is apparent that the first economic disadvantage of the present systems compels to implement large magnetically active surfaces even though the ferromagnetic workpiece to be clamped has a very small surface.

Indeed, besides the problem that the acquisition costs of the magnetic plate increases as the size of the element to be processed increases, and consequently of the corresponding magnetic plate necessary for clamping the element, there is also an exacerbation of the electrical/mechanical/management problems.

The main electrical problem is associated to the high number of the necessary electrical cables. For example, when a short-circuit occurs in a portion of the magnetic system, it causes a shut-down of the whole magnetic plate, negatively affecting the production, and causing the intervention of skilled technicians for its substitution.

The main mechanical problem is associated to the increase of the distance between the abutment points of the workpiece because the magnetic plate is configured with a radial polar arrangement. The distance among the abutment points of the workpiece on the magnetic area increases as the size of the surface increases which in turn causes a limitation of the machine performance in order to reduce the vibrations on the workpiece.

The main management problem is associated to the necessary handling of the magnetic system for moving it from the roughing step to the finishing step of the workpiece, which since is bulky imposes large spaces and expensive and consequently encumbrant handling systems.

TECHNICAL PROBLEM

From above, it is apparent that in the magnetic devices or apparatuses field, it is very felt the need of performing the operations of mechanical processing of ferrous elements, for example, the ring-shaped ones, by using magnetic devices which are less expensive and more reliable than the ones used until now.

Therefore, the problem underpinning the present invention consists of devising a magnetic device which has the operative characteristics such to satisfy said need, obviating, at the same time, the above mentioned inconveniences.

Technical Solution

Such problem is solved by a modular magnetic device for clamping ferromagnetic workpieces according to claim 1.

Advantageous Effects

Due to the present invention, it is possible to obtain a reduction of the acquisition costs because the modular magnetic device for clamping ferromagnetic workpieces is positioned only in proximity of the ferromagnetic workpiece to be clamped.

Due to the present invention, it is further possible to obtain the reliability advantages since the magnetic devices are modular which consequently insures their substitution, in case of faults, in any moment with other devices of the same type.

Moreover, due to the present invention, when a plurality of modular magnetic devices are connected one to the other, there are many abutment points for the workpiece to be clamped which can be easily removed and substituted, and further can be made of a magnetic and non-magnetic materials.

Such plurality of abutment points ensures a superior quality of the processings which are performed on the clamped elements.

BRIEF DESCRIPTION OF THE DRAWINGS

Further characteristics and advantages of the method according to the present invention will be understood from the following description of a preferred example of embodiment thereof given in an illustrative and non-limiting way, with reference to the attached figures, wherein.

DETAILED DESCRIPTION

Figure 1:
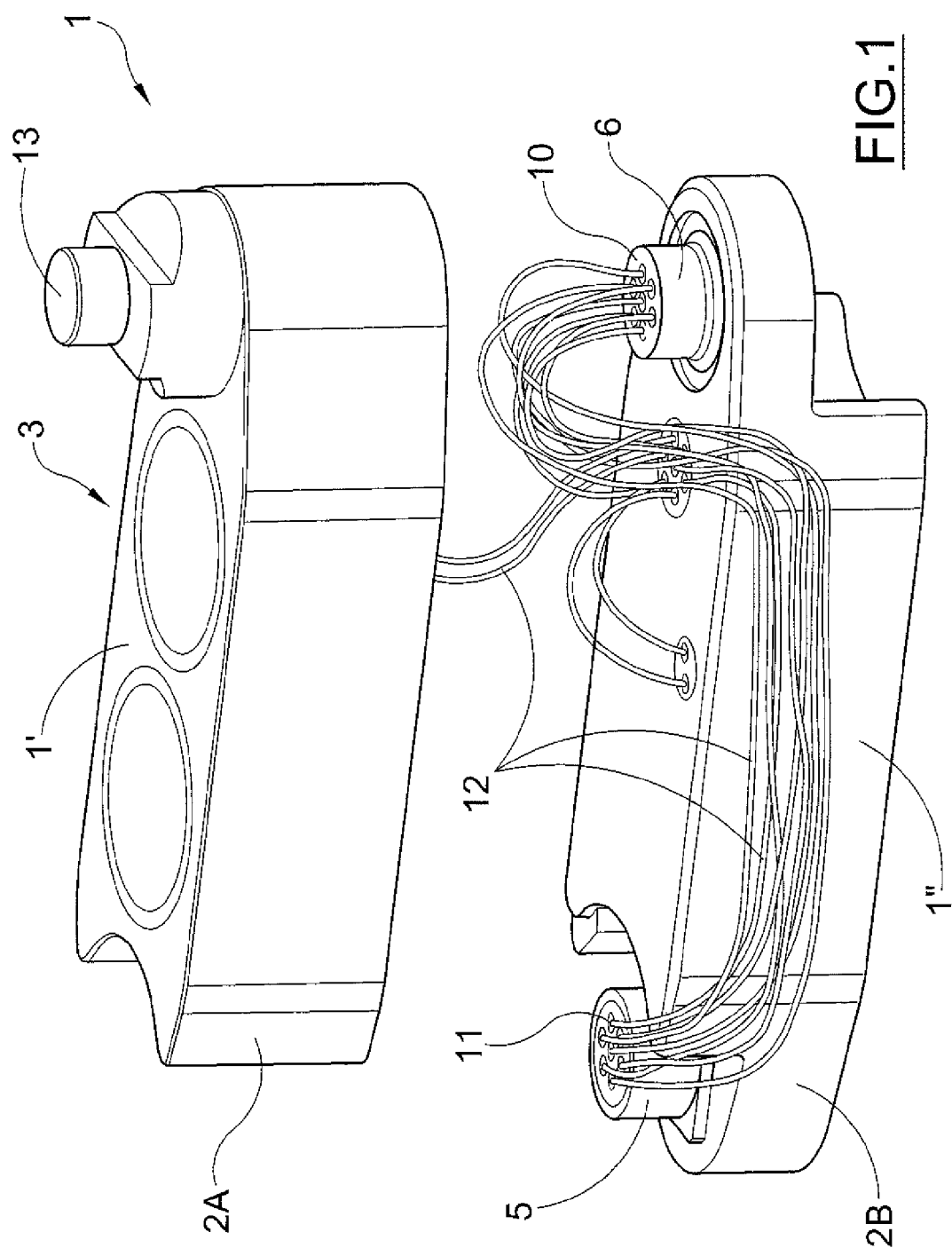
FIG. 1 shows a perspective exploded view of the modular magnetic device in an embodiment thereof.

With reference to the attached figures, reference number 1 shows a modular magnetic device according to the present invention.

The modular magnetic device 1 comprises a frame 2 in which a first magnetic circuit 3 and a second magnetic circuit 4 are arranged.

Frame 2 is made of ferromagnetic materials by manufacturing techniques known to a person skilled in the field and therefore they are not described.

For example, with reference to FIG. 1, it is noted that frame 2 of the modular magnetic device 1 comprises a first part 2A, in which the first magnetic circuit 3 is arranged, and a second part 2B in which the second magnetic circuit 4 is arranged.

Figure 2:
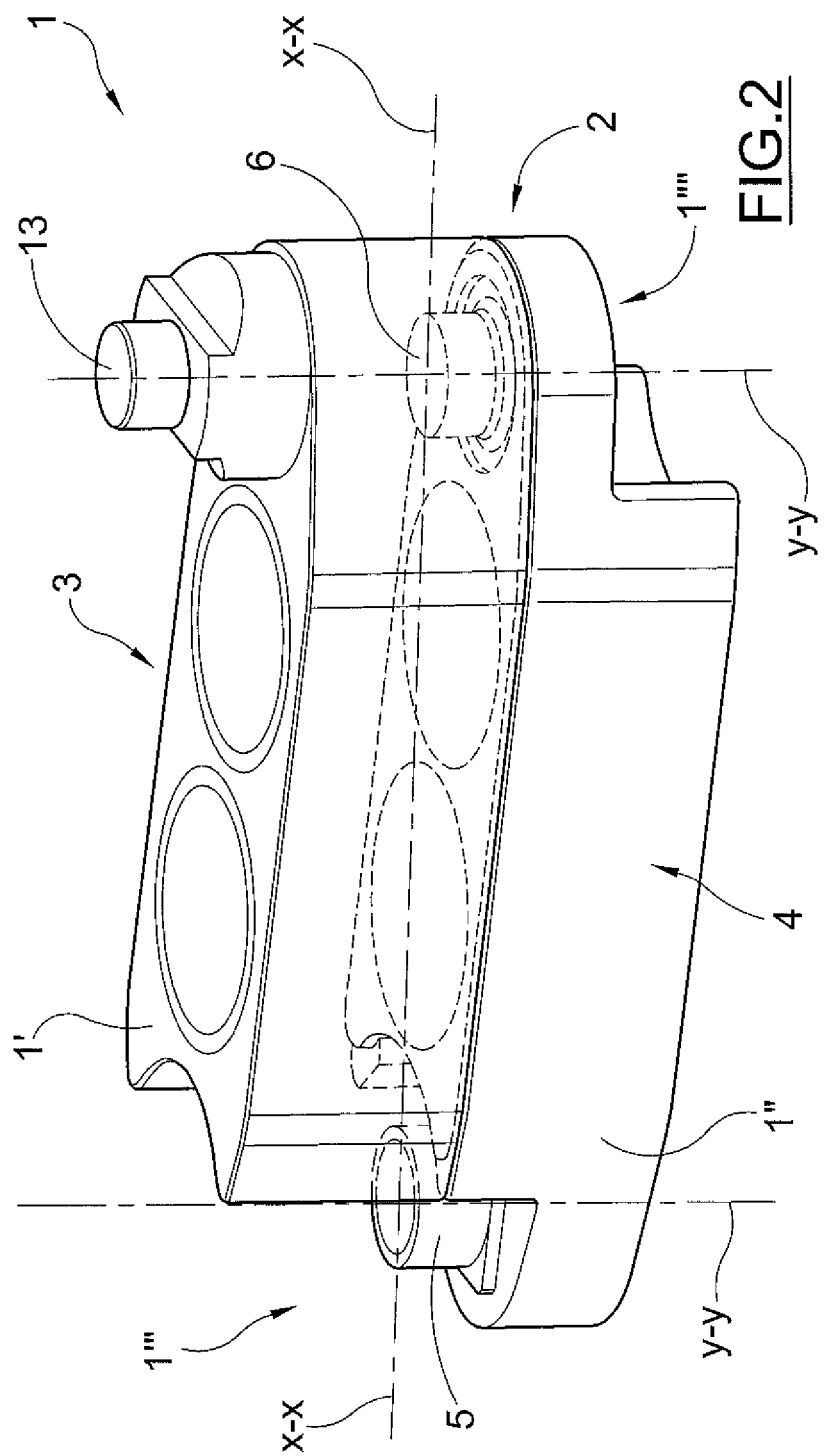
FIG. 2 shows a perspective view of the modular magnetic device of FIG. 1.

Particularly, such first part 2A can be distinct and separated from the second part 2B and, once they are reciprocally connected, as shown in FIG. 2, they can form the modular magnetic device 1.

Alternatively and, according to a preferred embodiment, the modular magnetic device 1 is monolithic or made in just one piece, in other words the first part 2A and second part 2B are integral.

Further, it is noted that frame 2 of the modular magnetic device 1 substantially extends along a longitudinal direction X-X and defines a first 1' and second sides 1" at the longest opposed surfaces whose ends define a rear part 1''' and a front part 1'''' of frame 2.

Particularly, according to the specific shown embodiment, the longitudinal direction X-X represents a symmetry axis of the frame 2 of device 1 so that the rear part 1''' and the front part 1'''' are opposed one to the other along said symmetry axis X-X.

The first magnetic circuit 3 is configured for generating a first magnetic field defining at the first side 1' of frame 2 a clamping magnetic plate.

Particularly, the first clamping magnetic plate is the surface of the modular magnetic device 1 adapted for clamping a ferromagnetic workpiece to be mechanically processed.

The second magnetic circuit 4 is configured for generating a second magnetic field defining, at the first side 1" of frame 2, a second clamping magnetic plate.

Particularly, the second clamping magnetic plate 1" is the surface of the modular magnetic device 1 adapted to clamp the modular magnetic device 1 to a bed of a machine tool (not shown in figures), in other words of the machine tool adapted to perform the mechanical operations of turning, milling, etc. on the ferromagnetic piece.

It is useful to note that the first part 2A of frame 2 is configured in order to house inside it, for example, the first magnetic circuit 3 while the second part 2B is configured in order to house the second magnetic circuit 4.

For example, the first and second magnetic circuits 3, 4 are of a known type, and are configured for generating an electropermanent magnetic field.

According to a preferred aspect of the present invention, the first magnetic circuit 3 and the second magnetic circuit 4 are independently controllable one from the other, in other words such first and second magnetic circuits 3, 4 can be turned on or off independently one from the other.

To such end, it is provided a control central unit (not shown in the figures) configured for delivering suitable electrical signals to the first and/or second magnetic circuits 3, 4 so that to perform the turning-on or turning-off cycles of the reversible magnetic cores forming the above mentioned magnetic circuits 3, 4 by energizing the electrical coils arranged around said magnetic cores.

It is better to note that the kind of magnetic circuit 3 can be as or different from the kind of magnetic circuit 4.

The first and second magnetic circuits 3, 4 are preferably distinct one from the other, but it is better to note that in some particular embodiments of the invention, the functions of such two magnetic circuits can be performed by only one magnetic circuit of the self-anchoring type, as the one described in document WO 2009/130722 A1, which is integrally incorporated as reference.

The characteristic of the modular magnetic device 1 consists of comprising first mechanical and electrical connection means 6, 10 and second mechanical and electrical connection means 5, 11.

It is useful to outline that the first mechanical connection means 6 and first electrical connection means 10 are integral one to the other, as well the second mechanical connection means 5 and the second electrical connection means 11.

Figure 3:
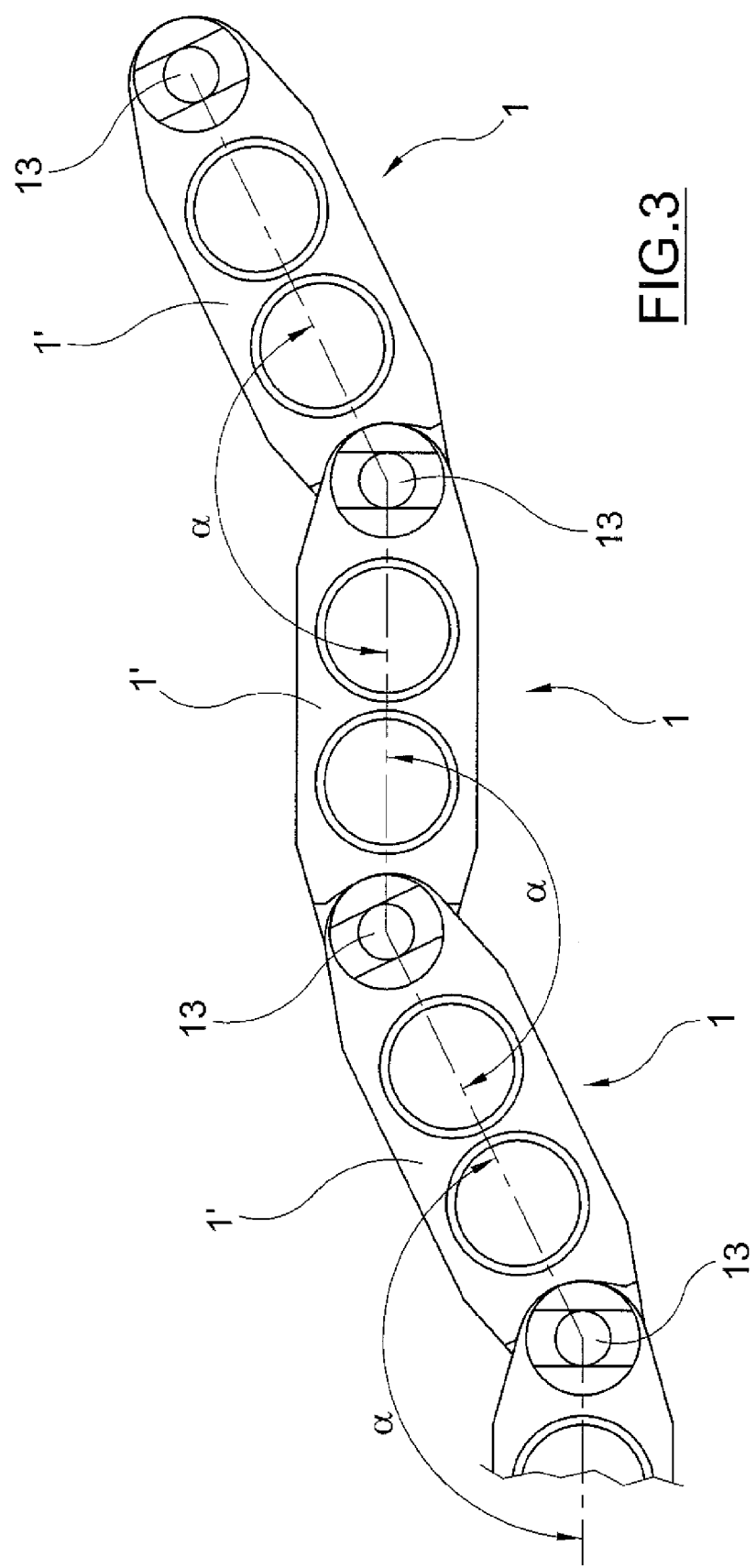
FIG. 3 shows a top plan view of a structure comprising a plurality of modular magnetic devices of the type shown in FIG. 1 when the latter are connected one to the other.

The second mechanical and electrical connection means 5, 11, when is in operation, enables to mechanically and electrically connect the modular magnetic device 1 to the corresponding first electrical and mechanical connection means 6, 10 of a second modular magnetic device in order to form a series of magnetic devices (see FIG. 3). In other words, by the electrical and mechanical connection between the corresponding second connection means of the first device and the first connection means of the second device, it is possible to electrically and mechanically link one to the other a series (two, three, four, five, ten, twenty or more) of magnetic devices arranged adjacent one to the other.

Therefore, it is possible to reciprocally connect a plurality of magnetic devices for forming a structure of electrically and mechanically connected magnetic devices, wherein each modular magnetic device 1 is a module of such structure.

According to a preferred embodiment in the proximity of the front portion 1'''' it is provided the housing of the first mechanical and electrical connection means 6, 10 while at the rear part 1''' it is provided the housing of the second mechanical and electrical connection means 5, 11.

In this way, it is possible to connect the head of a modular magnetic device 1 to the tail of the modular magnetic device adjacent thereto, and so on, to the extent that all the surface of the workpiece to be clamped is covered.

According to a preferred embodiment of the present invention, the first 6, 10 and second electrical and mechanical connection means 5, 11 of the modular magnetic device 1 and of the further modular magnetic devices are complementary means.

For implementing the mechanical and electrical connection among the second mechanical and electrical connection means 5, 11 of the first modular magnetic device, and the first mechanical and electrical connection means 6, 10 of the second adjacent modular magnetic device, the mechanical and electrical connection means must be complementary and must comprise means for linking the first modular magnetic device and its adjacent device configured for establishing a mechanical and electrical lock and for enabling a reciprocal movement between the two magnetic devices.

To this end, the linkage means are implemented by a rotary coupling about a constraint axis Y-Y, which is transversal, preferably, orthogonal to the extension direction X-X.

Preferably, the rotation about the constraint axis Y-Y is equal to an angle α which is comprised in a range of varying values, for example, between 0° and ±120°, so that said modular magnetic device can be tilted by said angle α relative to the adjacent modular magnetic device.

In other words, the linkage between the corresponding complementary mechanical and electrical connection means of the two magnetic devices provides that there is a coupling such to ensure an electrical, mechanical connection and a possible rotation about the constraint axis Y-Y.

Preferably, the linkage means extend along the constraint axis Y-Y.

In order to perform the electrical connection between the complementary first 6, 10 and second mechanical and electrical connection means 5, 11, the first and second electrical connection means comprise a male input connector 10 and a corresponding female output connector 11.

Such male 10 and female connectors 11 are arranged exactly where there are the mechanical connection means 6 and 5, respectively.

It is better to note that the male 10 and female connectors 11 are electrically connected one to the other by electrical cables 12.

Particularly, the electrical cables 12 are arranged inside each modular magnetic device, in other words they are not outside the modular magnetic devices.

This fact entails an easier maintenance, replacement of the modular magnetic devices, because it is absent the hindrance caused by the electrical cables.

When it is established the electrical connection between the second connection means 5, 11 of the first modular magnetic device and the first connection means 6, 10 of the second modular magnetic device adjacent thereto, it is possible, by the male input connector 10 of the first modular magnetic device, to transfer, by a plurality of electrical cables 12, the electrical signals generated by the central control unit to all the magnetic devices connected according to the described mode.

For example, the plurality of electrical cables 12 comprise seven cables each of them is responsible for conveying specific electrical signals as turning-on or turning-off signals, electrical protection signals, etc.

The male and female electrical connectors 10, 11 can be for example made by plugs and outlets, or by bayonet-type or similar couplings.

Advantageously, in order to enable said rotation between two magnetic devices, by avoiding unsuitable interferences and ensuring the greatest possible angle α, it is provided that the housing wherein the first mechanical and electrical connection means 6, 10 are received, in other words the front part 1'''', is a mirror-image of the rear part 1''' wherein the second mechanical and electrical connection means 5, 11 are located.

It is useful to note that, according to a characteristic aspect of the present invention, frame 2 of the modular magnetic device 1 has an area 13 which can be magnetic or non-magnetic acting as an abutment and reference point for the workpiece which must be processed.

In an embodiment, such area 13 can be coaxial with said first mechanical and electrical connection means 6, 10, in other words is coaxial with the constraint axis Y-Y of the linkage means.

Moreover, such area 13 can be easily replaceable and/or customized in order to adapt it to the processing workpiece specifications.

According to the specific embodiment illustrated in FIGS. 1 and 2, it is noted that for implementing the mechanical rotary coupling between two different modular magnetic devices, it is provided that the first mechanical connection means comprise a connector 6 of the first modular magnetic device wherein the second connection means comprise a connector 5 of the second modular magnetic device.

The coupling between connector 6 of the first modular magnetic device and connector 5 of the second modular magnetic device can be made by inserting connector 6 of the first modular magnetic device in connector 5 of second modular magnetic device in order to form a shape coupling having a tolerance adapted to enable a firm mechanical connection between the two magnetic devices and to enable the angular rotation α between the two magnetic devices about the common constraint axis Y-Y.

Such connectors 5 and 6 can have a substantially cylindrical shape even though different implementation forms are provided.

Therefore, due to the rotary coupling, the two magnetic devices can be rotated one from the other between 0° and ±120° with respect to the symmetry axis Y-Y.

When a plurality of magnetic devices are connected one to the other by the mechanical 6, 5 and electrical connection means 10, 11, it is possible to tilt each device with respect to its adjacent ones of an identical or different angle α, and is possible to implement a magnetic clamping structure having, for example, a circular shape (alternatively, also other shapes as for example the octagonal, hexagonal, square, rectangular shapes).

Due to that, it is possible to magnetically anchor and perform mechanical processing operations on a workpiece of any shape, such for example a circular shape, without wasting the magnetic clamping surface.

Obviously, a person skilled in the art, in order to satisfy contingent and specific needs, could add several modifications and variations to the above described modular magnetic device, all falling anyway in the scope of the invention as defined in the following claims.

The invention claimed is:

1. A magnetic device for clamping ferromagnetic workpieces comprising a frame having:
   a first magnetic circuit which is configured to generate a first magnetic field adapted to clamp a ferromagnetic workpiece to be processed,
   a second magnetic circuit which is configured to generate a second magnetic field adapted to clamp said ferromagnetic workpiece to a machine tool bed,
   said first magnetic circuit and said second magnetic circuit being adapted to be controlled to turn on and/or off independent of each other,
   wherein the magnetic device comprises first and second mechanical and electrical connection means for mechanically and electrically connecting said magnetic device, when in operation, to second and first complementary mechanical and electrical connection means of other modular magnetic devices located adjacent thereto, to create a series of modular magnetic devices mechanically and electrically connected together.

2. A magnetic device as claimed in claim 1, wherein said first and second mechanical and electrical connection means comprise mechanical linkage means for providing mechanical coupling while allowing mutual motion between a modular magnetic device and another modular magnetic device adjacent thereto.

3. A magnetic device as claimed in claim 2, wherein said linkage means include a rotary coupling, involving rotation about a constraint axis.

4. A magnetic device as claimed in claim 3, wherein said linkage means comprise a rotary coupling, for allowing rotation about said constraint axis over an angle that falls within a range from 0 to ±120° so that said magnetic device can be tilted by said angle relative to the magnetic device adjacent thereto.

5. A magnetic device as claimed in claim 1, wherein said first and second mechanical and electrical connection means comprise a male input electrical connector and a respective female output electrical connector.

6. A magnetic device as claimed in claim 3, wherein said magnetic device mainly extends in a longitudinal direction and defines first and second sides at the opposed larger surfaces whose ends define a front part and a rear part of said frame, said longitudinal direction forming an axis of symmetry for said frame, so that the front part and the rear part oppose each other along said axis of symmetry, said constraint axis being transverse, preferably orthogonal to said direction of extension.

7. A magnetic apparatus as claimed in claim 6, wherein said front part is complementary to the rear part.

8. A magnetic device as claimed in claim 3, comprising at least one magnetic or non-magnetic area which is coaxial to said constraint axis.

9. A magnetic device as claimed in claim 1, comprising a first part having said first magnetic circuit disposed therein and a second part having said second magnetic circuit disposed therein.

10. A magnetic device as claimed in claim 1, wherein the first mechanical connection means integrate the first electrical connection means and the second mechanical connection means integrate the second electrical connection means.

* * * * *